UNITED STATES PATENT OFFICE.

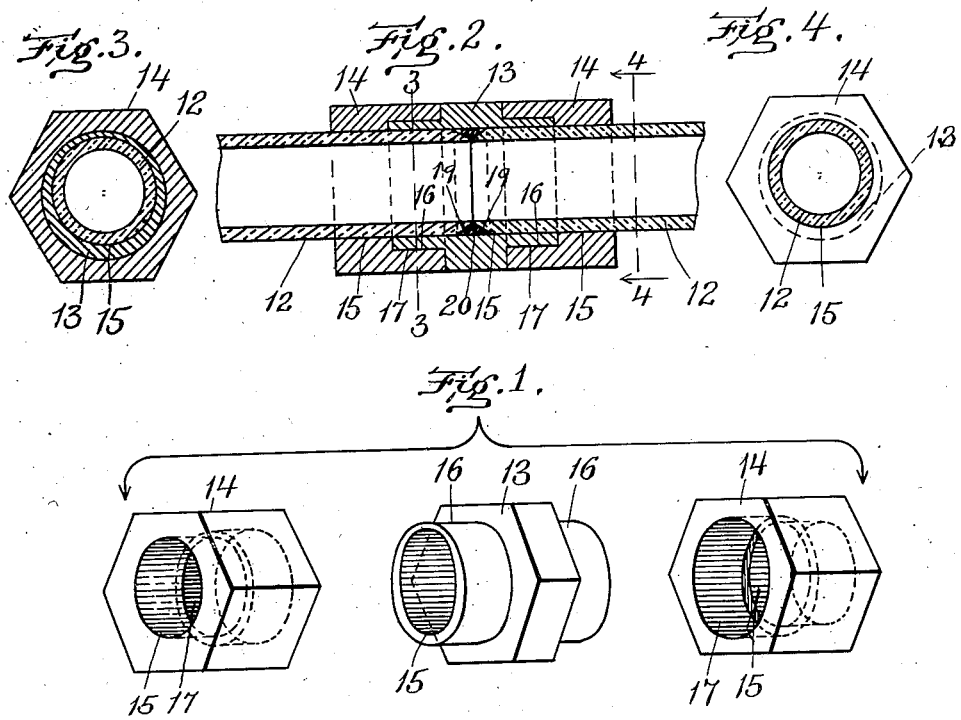

JOHN EMERY HARRIMAN, JR., OF BROOKLINE, AND JOHN F. HENDRICKSON, OF QUINCY, MASSACHUSETTS.

COUPLING FOR PIPES, RODS, &c.

954,957.  Specification of Letters Patent.  Patented Apr. 12, 1910.

Application filed November 2, 1908. Serial No. 460,608.

*To all whom it may concern:*

Be it known that we, JOHN EMERY HARRIMAN, Jr., of Brookline, in the county of Norfolk and State of Massachusetts, and JOHN F. HENDRICKSON, of Quincy, in the county of Norfolk and State of Massachusetts, have invented certain new and useful Improvements in Couplings for Pipes, Rods, &c., of which the following is a specification.

This invention relates to pipe couplings and has for its object to provide means whereby two pipes may be firmly connected together by means of an entire friction grip, so that no screw threads are required in any member of the coupling, the construction being such that there can be no leakage at the joint.

To these ends the invention consists in the pipe coupling substantially as hereinafter described and claimed.

Of the accompanying drawings, forming a part of this specification,—Figure 1 represents in separate perspective views, the three members of our improved coupling. Fig. 2 represents a longitudinal section showing the members assembled and connecting the abutting ends of two smooth pipes. Fig. 3 represents a section on line 3, 3, of Fig. 2. Fig. 4 represents a section on line 4, 4, of Fig. 2.

Similar reference characters indicate the same parts in all of the figures.

Two smooth surfaced cylindrical pipes 12, 12 are firmly clamped end to end by means of the coupling which comprises a central member 13, and two end members 14, 14. Each of said members has a circular socket 15 extending entirely through it, the sockets of the three members being of the same diameter and adapted to be alined with each other, as shown in Fig. 2. The central member 13 is provided with two external faces 16 which surround and are eccentric to the socket 15 in said member. Each of the end members 14 has an internal face 17 which surrounds and is eccentric to its socket, and has a sliding fit on one of the eccentric external faces 16 of the central member, each end member being rotatable relatively to the central member.

In the construction here shown, the external eccentric faces of the central member are formed by reducing the end portions of said member, the said member having an enlarged central portion located between the external faces 16, and provided with a polygonal surface adapted to engage a wrench. The eccentric internal faces 17 of the end members are formed by enlarging the sockets in said members, the end members having polygonal wrench-engaging external surfaces. As shown, these coacting external eccentric faces 16 of the central member and eccentric internal faces 17 of the two end members present uninterrupted cylindrical surfaces which enable the members to be relatively rotated in either direction until they bind, which could not be done if any abrupt shoulders were presented by the coacting faces. The formation of the said members is such that they may be adjusted with the sockets exactly in alinement to receive the end portions of pipes 12, said pipes meeting within the central member 13. When the parts are thus assembled, a slight rotation of each end member relatively to the central member will move the sockets slightly out of alinement and cause the socket walls to take a firm grip upon the pipes 12 inserted therein, this action being due to the eccentricity of the faces 16 and 17.

The ends of the pipes are preferably beveled as shown at 19, and in the angular cavity formed inside the member 13 and between the ends of the pipes we place an elastic packing ring 20, which is so proportioned that it will be compressed by the meeting of the ends of the bodies 12, and will prevent leakage at the joint formed by said meeting ends. This joint becomes automatically sealed by the internal pressure of the fluid passing through the pipes, because the outward pressure against the ring 20, due to the fact that the opposing ends of the pipes cannot exclude such pressure, results in spreading the ring both ways into the angles where the end faces of the two pipes meet the inner wall of the member 13. Therefore close sealing of the joint increases as the internal pressure becomes greater.

It will now be understood that we have provided a coupling, by means of which screw-threading is entirely dispensed with, the two pipes being simply pressed closely enough together to compress the packing in the cavity described, and then the rotation of the end members as described will firmly grip the pipes in their relative positions by a purely frictional hold. If it should be desired to increase the density of the packing, no rotation of either pipe member is necessary, it being sufficient to reverse the rotation of one of the end members 14, and force that pipe endwise sufficiently to further compress the packing.

This structure provides a three-part equalizing, as well as a threadless, coupling which can be quickly applied, and which never requires the rotation of either of the two cylindrical bodies connected by said coupling. A simple rotation of the end members in opposite directions simultaneously grips both of said bodies, and if one comes to halt before the other it simply holds the intermediate member while said other end member is being given sufficient further movement to effect a final grip which is equal at both ends of the coupling.

Having now described our invention, what we claim is:

1. A three-part, threadless, coupling comprising a central member having sockets and circular faces surrounding and eccentric to the sockets, and two end members each having a socket and a circular face eccentric to the socket, the coacting faces of all three members presenting uninterrupted cylindrical surfaces, the faces of the end members being frictionally engaged with the faces of the central member, so that the end members may be rotated in either direction relatively to the central member to cause the binding of the socket walls on cylindrical bodies inserted in the coupling in alinement.

2. A three-part, threadless, coupling, combined with two externally smooth cylindrical bodies, said coupling comprising a central member having sockets and circular faces eccentric to the sockets, and two end members each having a socket and a circular face surrounding and eccentric to the socket, the coacting faces of all three members presenting uninterrupted cylindrical surfaces, the faces of the end members being frictionally engaged with the faces of the central member, so that the end members may be rotated in either direction relatively to the central member to cause the binding of the socket walls on said bodies inserted in the coupling, each member of the coupling being adapted to receive a wrench.

In testimony whereof we have affixed our signatures, in presence of two witnesses.

JOHN EMERY HARRIMAN, Jr.
JOHN F. HENDRICKSON.

Witnesses:
E. BATCHELDER,
P. W. PEZZETTI.